(12) United States Patent
Tarleton et al.

(10) Patent No.: US 11,392,281 B1
(45) Date of Patent: *Jul. 19, 2022

(54) HIERARCHICAL DATA DISPLAY (71) Applicant: United Services Automobile Association (USAA), San Antonio, TX (US)

(72) Inventors: Shane Houston Tarleton, San Antonio, TX (US); Charlotte Hamner Nagy, Boerne, TX (US); Adam Jon Udell, San Antonio, TX (US); Emily Anes Simmons, Boerne, TX (US); James Donbavand, San Antonio, TX (US); Sydney Zarrish Condie, San Antonio, TX (US); Urmil Ramesh Divecha, Helotes, TX (US); Chris Michael Braden, Hondo, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,685

(22) Filed: Apr. 26, 2021

Related U.S. Application Data

(63) Continuation of application No. 15/660,619, filed on Jul. 26, 2017, now Pat. No. 10,990,255.

(Continued)

(51) Int. Cl.
*G06F 17/00* (2019.01)
*G06F 3/04842* (2022.01)
(Continued)

(52) U.S. Cl.
CPC ........ *G06F 3/04842* (2013.01); *G06T 11/206* (2013.01); *G06F 16/185* (2019.01); *G06F 16/22* (2019.01); *G06T 2200/24* (2013.01)

(58) Field of Classification Search
CPC .... G06F 3/04842; G06F 16/185; G06F 16/22; G06T 11/206; G06T 2200/24
See application file for complete search history.

(56) References Cited

U.S. PATENT DOCUMENTS

2002/0107859 A1 8/2002 Tsuyuki
2004/0243564 A1 12/2004 Taylor et al.
(Continued)

FOREIGN PATENT DOCUMENTS

JP 2006018596 1/2006

OTHER PUBLICATIONS

Yu et al., Visualizing Changes of Hierarchical Data using Treemaps, IEEE, 2007, pp. 1286-1293 (Year: 2007).*

*Primary Examiner* — Andrew T McIntosh
(74) *Attorney, Agent, or Firm* — Fletcher Yoder, P.C.

(57) ABSTRACT

Systems and methods are provided for efficient storage and/or processing of enterprise data. A set of data from a content management system (CMS) is received and interpreted to determine a hierarchical object structure for the set of data. The hierarchical object structure includes: at least one parent object; at least one child object that is a subordinate object of the parent object; an indication of each parent/child relationship; and a set of attributes for each of the objects. The set of attributes for each of the at least one parent object and the at least one child object are analyzed in light of the indication of each parent/child relationship to gather accumulated attribute data. A graphical user interface (GUI) is rendered that presents one or more graphical cards representing the objects.

17 Claims, 11 Drawing Sheets

Related U.S. Application Data

(60) Provisional application No. 62/367,457, filed on Jul. 27, 2016.

(51) Int. Cl.
  *G06T 11/20* (2006.01)
  *G06F 16/22* (2019.01)
  *G06F 16/185* (2019.01)

(56) References Cited

U.S. PATENT DOCUMENTS

| | | |
|---|---|---|
| 2008/0300952 A1 | 12/2008 | Couper et al. |
| 2009/0006427 A1* | 1/2009 | Veeraraghavan ... G06F 3/04845 |
| 2011/0225506 A1* | 9/2011 | Casalaina ............ G06Q 30/016 |
| | | 715/741 |
| 2012/0173585 A1 | 7/2012 | Pan et al. |
| 2013/0232539 A1* | 9/2013 | Polunin ................ G06Q 10/047 |
| | | 726/1 |
| 2014/0047361 A1* | 2/2014 | Gaspar .................... G06F 3/048 |
| | | 715/762 |
| 2014/0365389 A1 | 12/2014 | Cheek et al. |
| 2015/0058775 A1* | 2/2015 | Krebs .................. G06F 3/0485 |
| | | 715/771 |
| 2017/0255344 A1* | 9/2017 | Bianchini ............. G06F 16/248 |

\* cited by examiner

```
+ UUID: 01011
    NAME: JOHN DOE
    TITLE: CEO
    SUBORDINATES:
        + UUID: 10111
            NAME: SALLY SMITH
            TITLE: DIRECTOR
            SUBORDINATES:
                + UUID: 00111
                    NAME: AMY ADAMS
                    TITLE: MANAGER
                    SUBORDINATES:
                        + UUID: 00001
                            NAME: BOB BILLINGS
                            TITLE: CONTRACTOR
                        + UUID: 00002
                            NAME: CARLA CALLINS
                            TITLE: INDIVIDUAL CONTRIBUTOR
                + UUID: 00112
                    NAME: BEBBIE DURST
                    TITLE: INDIVIDUAL CONTRIBUTOR
                + UUID: 00113
                    NAME: EVAN ERT
                    TITLE: MANAGER
                    SUBORDINATES:
                        + UUID: 00003
                            NAME: FRED FIN
                            TITLE: CONTRACTOR
                        + UUID: 00004
                            NAME: GEORGE GIN
                            TITLE: INDIVIDUAL CONTRIBUTOR
        + UUID: 10112
            NAME: HEATHER HINDES
            TITLE: DIRECTOR
            SUBORDINATES:
                + UUID: 00114
                    NAME: ION IOTA
                    TITLE: CONTRACTOR
                + UUID: 00115
                    NAME: JACKIE JOHNSON
                    TITLE: INDIVIDUAL CONTRIBUTOR
```

HIERARCHICAL DATA DISPLAY

CROSS-REFERENCE TO RELATED APPLICATION

This application is a continuation of U.S. patent application Ser. No. 15/660,619, entitled "HIERARCHICAL DATA DISPLAY," filed Jul. 26, 2017, which claims priority to and the benefit of U.S. Provisional Application No. 62/367,457, entitled "HIERARCHICAL DATA DISPLAY," filed Jul. 27, 2016. These applications are hereby incorporated by reference in their entireties for all purposes.

BACKGROUND

The present disclosure relates generally to enterprise data handling. More specifically, the present disclosure relates to presentation of hierarchical enterprise data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Generally speaking, embodiments provided herein relate to systems and methods for obtaining, organizing, and presenting hierarchical electronic data in an efficient manner. In certain embodiments, a data source may provide data that is injected into a hierarchical data model. The hierarchical data model may be efficiently accessed to provide tree and node processing, resulting in efficient rendering of a graphical user interface representing the hierarchical data.

In a first embodiment, a tangible, non-transitory, machine-readable medium, includes machine readable instructions to: receive a set of data from a content management system (CMS) and interpret the set of data to determine a hierarchical object structure for the set of data. The hierarchical object structure includes at least one parent object; at least one child object that is a subordinate object of the parent object; an indication of each parent/child relationship between the at least one parent object and the at least one child object; and a set of attributes for each of the at least one parent object and the at least one child object. The instructions: analyze the set of attributes for each of the at least one parent object and the at least one child object in light of the indication of each parent/child relationship to gather accumulated attribute data; and render a graphical user interface (GUI) that presents one or more graphical cards representing the at least one parent object and the at least one child object, the one or more graphical cards comprising the accumulated attribute data for a corresponding card.

In a second embodiment, a computer-implemented method, includes: receiving a set of data from a content management system (CMS); and interpreting the set of data to determine a hierarchical object structure for the set of data. The hierarchical object structure includes: at least one parent object; at least one child object that is a subordinate object of the parent object; an indication of each parent/child relationship between the at least one parent object and the at least one child object; and a set of attributes for each of the at least one parent object and the at least one child object. The method further includes: analyzing the set of attributes for each of the at least one parent object and the at least one child object in light of the indication of each parent/child relationship to gather accumulated attribute data; and rendering a graphical user interface (GUI) that presents one or more graphical cards representing the at least one parent object and the at least one child object, the one or more graphical cards comprising the accumulated attribute data for a corresponding card.

In a third embodiment, A system, includes: a tangible, non-transitory, storage medium; a display, configured to present a graphical user interface (GUI) that presents one or more graphical cards representing at least one parent object and at least one child object; and one or more processors, configured to: receive a set of data from a content management system (CMS); and generate a hierarchical object structure for the set of data. The hierarchical object structure includes: at least one parent object; at least one child object that is a subordinate object of the parent object; an indication of each parent/child relationship between the at least one parent object and the at least one child object; and a set of attributes for each of the at least one parent object and the at least one child object. The processors further: store the hierarchical object structure in the storage medium and analyze the set of attributes for each of the at least one parent object and the at least one child object in light of the indication of each parent/child relationship to gather accumulated attribute data. The one or more graphical cards present the accumulated attribute data for a corresponding card. The processors further render the graphical user interface (GUI) on the display, using the accumulated attribute data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein:

FIG. 4' illustrates an alternative schematic view of a rendering of the hierarchical data of FIG. 3, in accordance with certain embodiments;

FIG. 7' illustrates an alternative resultant rendering of the graphical user interface based upon navigation via the process of FIG. 6, in accordance with certain embodiments;

FIG. 9' illustrates an alternative resultant rendering of the graphical user interface based upon a move modification via the process of FIG. 8, in accordance with certain embodiments;

FIG. 10' illustrates an alternative resultant rendering of the graphical user interface based upon a deletion modification via the process of FIG. 8, in accordance with certain embodiments;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, the current embodiments may be implemented by one or more computer-processors that implement one or more machine-readable instructions stored on a tangible, non-transitory, machine-readable medium and/or by specialized circuitry designed to implement the discussed features.

The information age has brought about rapid advancements in telecommunication, hardware-based computing, software, and other data related activities. Thus, the current information-based society has resulted in the generation of a vast amount of valuable digital resources with more and more data consumption by customers, vendors, and electronic devices. For example, many organizations may make use of analytics data within the organizations for use in business intelligence and other statistical analysis functions. Data collection has and will continue to exponentially increase. Unfortunately, as more data is collected, processing may become more complex, requiring increased processing power and time. As the data is increasingly relied upon for business intelligence and other analytical functions, rapid access may be beneficial.

Figure 1:
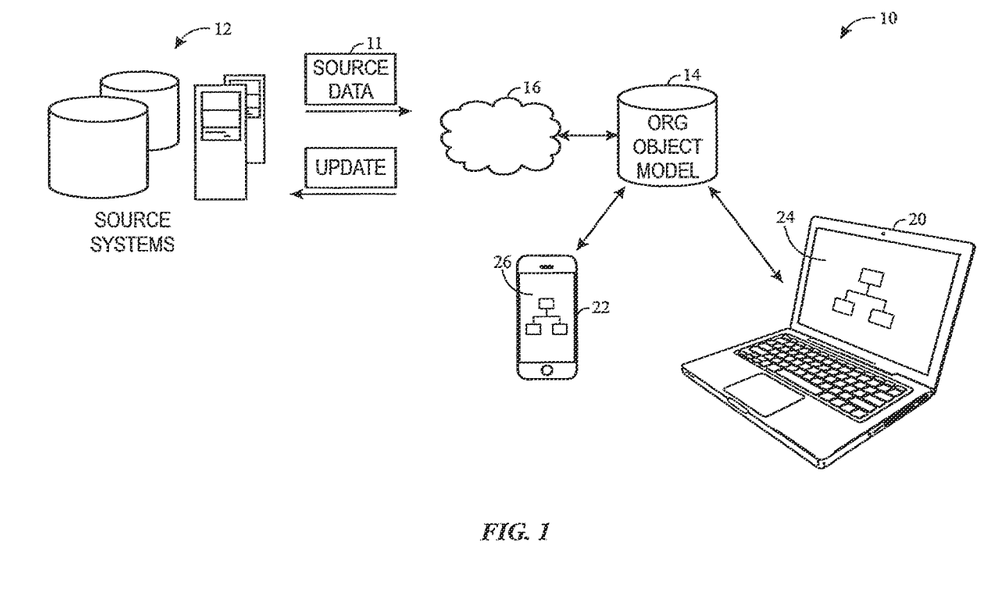
FIG. 1 illustrates a schematic diagram of a hierarchical data rendering system, in accordance with certain embodiments described herein.

Accordingly, as discussed above, new techniques may be implemented to efficiently store and render graphical presentations of hierarchical enterprise data (e.g., via a graphical user interface rendered on an electronic device display). By way of introduction, FIG. 1 illustrates a schematic diagram of a hierarchical data rendering system 10, in accordance with certain embodiments described herein. The system 10 may include a source data system 12, which provides enterprise data 11 that may be constructed into a hierarchical object/data model 14, via processes 16.

The source data system 12 may be any data source. For example, the source data system 12 may be a content management system (CMS), such as a human resources CMS that provides employee information including names, job titles, reporting employees, managing employees, etc. In alternative embodiments, the source data system 12 could be an automotive parts CMS, a computer aided design (CAD) application, etc.

For simplicity of discussion, the current embodiments relate to the human resources CMS. However, this is not intended to limit embodiments to such human resource embodiments. As may be appreciated by those skilled in the art, the current techniques can be applied to any data that may be structured in a hierarchical format.

As mentioned above, the data 11 is provided to processes 16, resulting in an organization data/object model 14. As will be discussed in more detail regarding FIG. 3, the data/object model 14 may transform the data into a hierarchical tree and node structure, based upon a relationship between the data. For example, as mentioned above, the data 11 may include managing employees and direct reports. The data may be arranged in a tree according to this relationship, such that managing employees are assigned parent nodes and direct reports are assigned child nodes. This process may continue, iteratively, until all data is processed into a tree and node structure.

Once the object model 14 is created, a computer 20 or other electronic device 22 browser interface may interpret the object model 14 and render a graphical user interface 24 or 26, respectively, of the structured data of the data/object model 14.

In certain embodiments, the data may remain in a flattened state. For example, the data may be retained in a comma separated values (CSV) file that explains the relationship between data, while not physically stored in the tree/node structure. This flat data may be provided to scripting code implementable by the computer 20 or other electronic device 22 browser interface, resulting in promotion of the hierarchical processing to the front end of the system 10 (e.g., the computer 20 or other electronic device 22).

Figure 2:
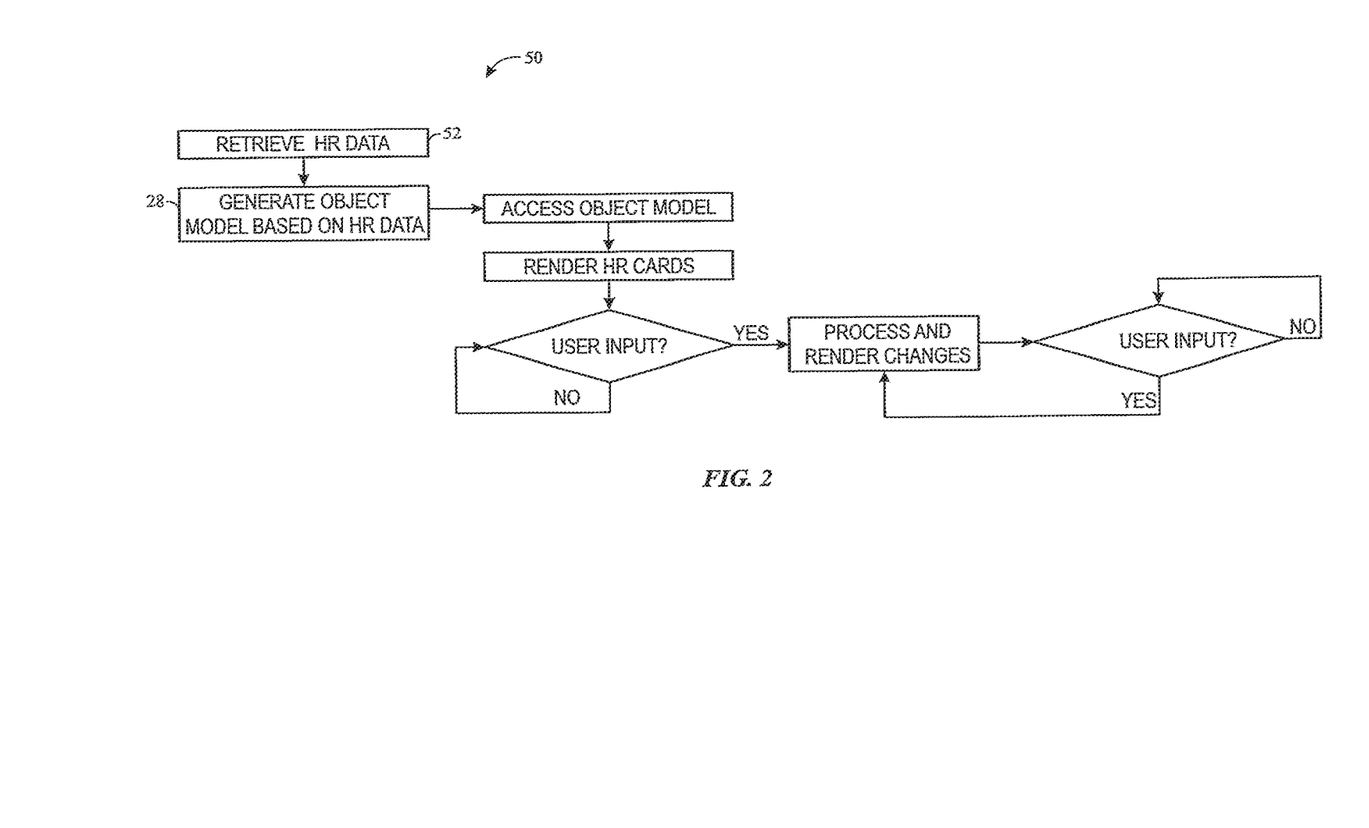
FIG. 2 illustrates a flowchart of a process for efficient rendering of hierarchical data, in accordance with certain embodiments described herein.

FIG. 2 illustrates a flowchart of a process 50 for efficient rendering of hierarchical data, in accordance with certain embodiments described herein. The left column illustrates back-end processing 52 and the right column illustrates front-end processing 54. As previously mentioned, portions of the back-end processing 52 may take place in the front-end processing 54 and visa-a-versa.

The process 50 begins by retrieving human resources data (block 56). For example, as previously discussed in FIG. 1, the source system 12 may provide source data 11 to processes 16. The source system 12 data 11 may be sent to the processes 16 via a periodic bulk data transfer, automatically as data changes in the source system (e.g., via delta data packages), etc.

Upon receiving the data, the object model is generated based upon the data 11 (block 58). For example, as will be discussed below regarding FIG. 3, the hierarchical data/object model 14 may transform data into a tree/node type structure and/or sort the data such that a parent/child relationship between the data is readily interpretable by the front-end processing 54.

Turning now to the front-end processing 54, the data/object model 14 is accessed to determine the parent/child relationship of the data 11 (block 60). For example, as will be discussed in more detail below, nodes of the data/object model 14 may be iteratively traversed to understand the relationship of the data and/or to obtain statistics regarding the hierarchical relationships of the data.

Based upon an analysis of the access data/object model, the graphical user interface (GUI) may be rendered, indicating the hierarchical relationship and/or statistics of the hierarchical relationship. For example, in the current embodiment, an organizational chart is rendered with human resource "cards" that provide information about employees of an organization (block 62).

The front-end processing 54 may poll for user inputs to the rendered GUI (decision block 64). When a user input is received, the front-end processing 54 interprets the user input, determines an appropriate response, and processes and renders the appropriate GUI and/or hierarchical data changes (block 66). For example, a user may indicate that additional information about an employee is requested, by clicking on a particular human resource card (i.e., a graphical representation in the GUI). Because the processing is merely presenting additional data already in the data/object model 14, the front-end processing 54 does not modify the data/object model 14, but instead modifies the GUI (e.g., GUI 24 and/or GUI 26 of FIG. 1). The front-end processing 54 continues to poll for additional user inputs (decision block 68) and processes and renders additional changes as necessary (block 66).

Figure 3:
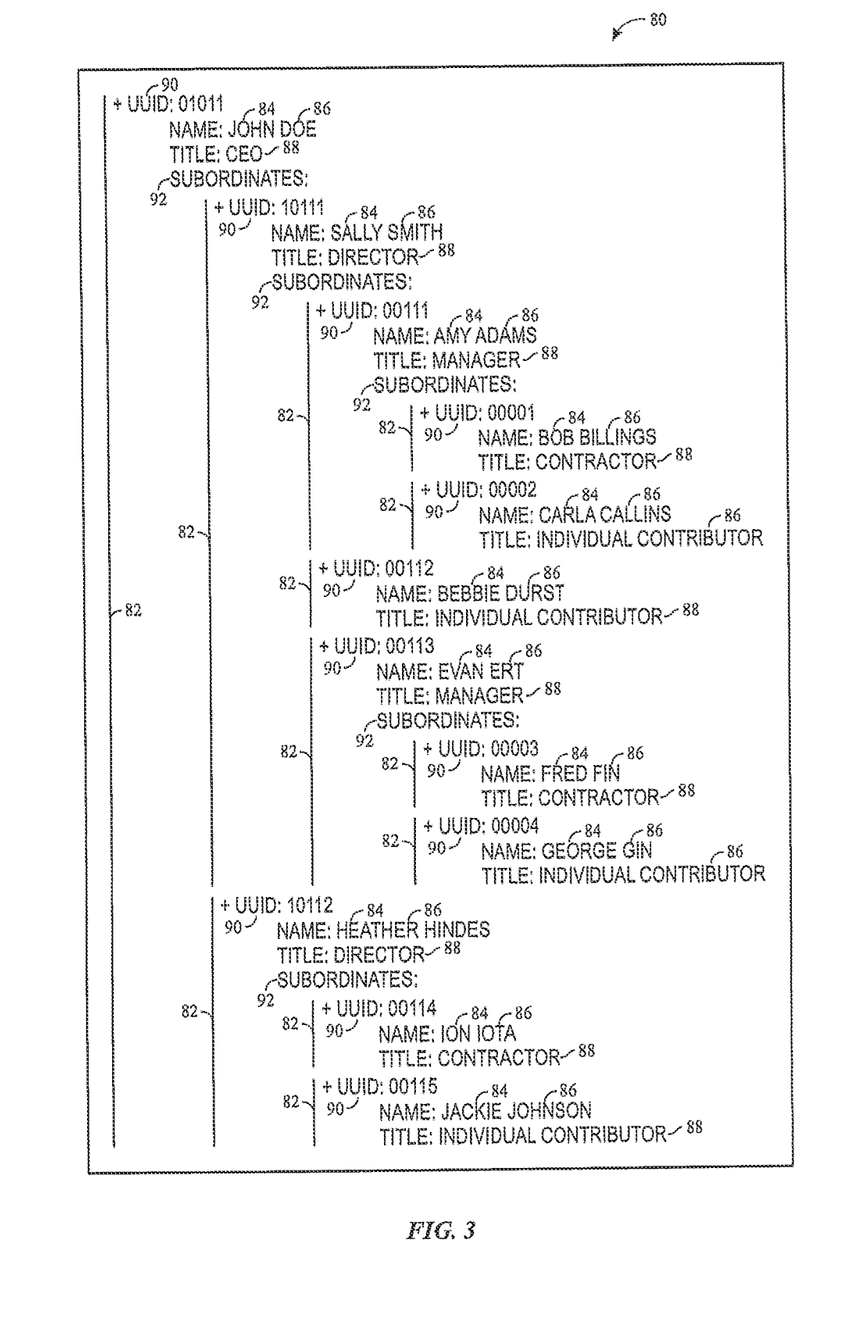
FIG. 3 illustrates a schematic illustration of a hierarchical data model of human resources data, in accordance with certain embodiments described herein.

FIG. 3 illustrates a schematic illustration of a hierarchical data/object model 80 of human resources data, in accordance with certain embodiments described herein. As illustrated, the data/object model 80 may include a parent/child node structure of employee objects 82. The employee objects 82 may include pertinent employee information, such as first name 84, last name 86, job title 88, business organizations the employee is a part of (not depicted), a unique identifier ("UUID") or primary key 90, and subordinate employees 92 (e.g., as child nodes).

As mentioned above, the current structure is only one embodiment of a data/object model 14. In alternative embodiments, the data/object model 14 could be flattened, such as in a comma separated values (CSV) file that includes relational values, such as the subordinate employees held as a field value of the CSV. In such embodiments, the front-end processing 54 of FIG. 2 may interpret the CSV file to render the human resources cards, in lieu of generating a hierarchical data/object model 14.

Figure 4:
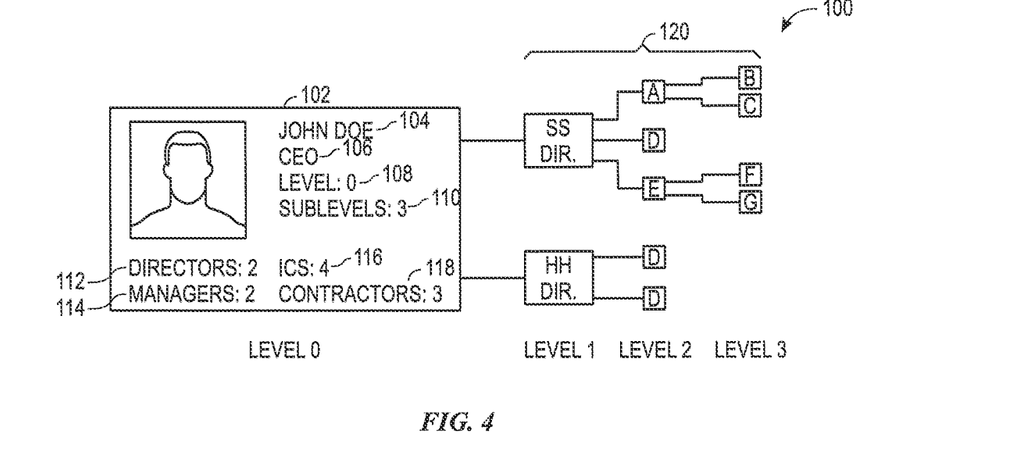
FIG. 4 illustrates a schematic view of a rendering of the hierarchical data of FIG. 3, in accordance with certain embodiments.

FIG. 4 illustrates a schematic view of a rendering 100 of the hierarchical data of FIG. 3, in accordance with certain embodiments. The rendering 100 may be a result of the card rendering, as represented by block 62 of FIG. 2, in some embodiments. As illustrated, in the current embodiment, a default human resources card 102 is expanded, showing details of the employee. For example, the default human resources card 102 represents "John Doe", who is the CEO of the organization, as indicated by the name 104 and title 106, respectively. Additional details regarding the hierarchical relationship of John Doe's data with the rest of the hierarchical data is also provided. For example, in the current embodiment, a level indicator 108 indicates that John Doe is at the top of the organization (e.g., Level 0). Further, the sublevel indicator 110 indicates that there are 3 levels under John Doe (e.g., levels 1, 2, and 3). Further, a director indicator 112 indicates that 2 directors are under John Doe (at some sublevel), a managers indicator 114 indicates that 2 managers are under John Doe (at some sublevel), an individual contributors (ICS) indicator 116 indicates that 4 individual contributors are under John Does (at some sublevel), and a contractors indicator 118 indicates that 3 contractors are under John Doe (at some sublevel). Any other information available in and/or attainable by the data/object model 14 may be presented in the card 102.

In the current embodiment, the sublevel cards 120 remain unexpanded until a user indication indicates that a particular card of the cards 120 should be expanded. In such embodiments, GUI real-estate may be preserved, by limiting the number of expanded cards.

FIG. 4' illustrates an alternative schematic view of a rendering 140 of the hierarchical data of FIG. 3, in accordance with certain embodiments. In the current embodiment, the default card 120 and its direct children cards 142 (e.g., direct reports) are expanded by default. As a user input 144 is applied to one of the cards, (here Sally Smith's card), Sally Smith's direct children cards 146 are expanded. Upon receiving user input 148 on Amy Adams' card, her direct children's cards 150 are expanded 150.

In the current embodiment, the name indicator 104 and title indicator 106 are once again present. However, alternative information is also provided in the cards of the current embodiment. For example, a total employee indicator 152 indicates the total number of employees underneath a card (e.g., 11 employees under John Doe, 2 employees under Amy Adams, etc.). The Direct Reports indicator 154 indicates a number of first level children (e.g., direct reports) for the card. For example, John Doe has two direct reports, Heather Hindes and Sally Smith. The Layers indicator 156 indicates the number of layer's in the cards path and the particular layer in the path that the card is in. For example, there are 0-3 levels on Bob Billings' path. Further, Bob Billings is on Level 3 of that 0-3 path. Accordingly, the layers indicator 156 for Bob Billings indicates "3/3." In some alternative embodiments, the indicator may indicate a number of levels above and below the card. For example, there are 3 levels above Bob and 0 below Bob. Accordingly, the level indicator 156, in such embodiments, might indicate "3/0."

Figure 5:
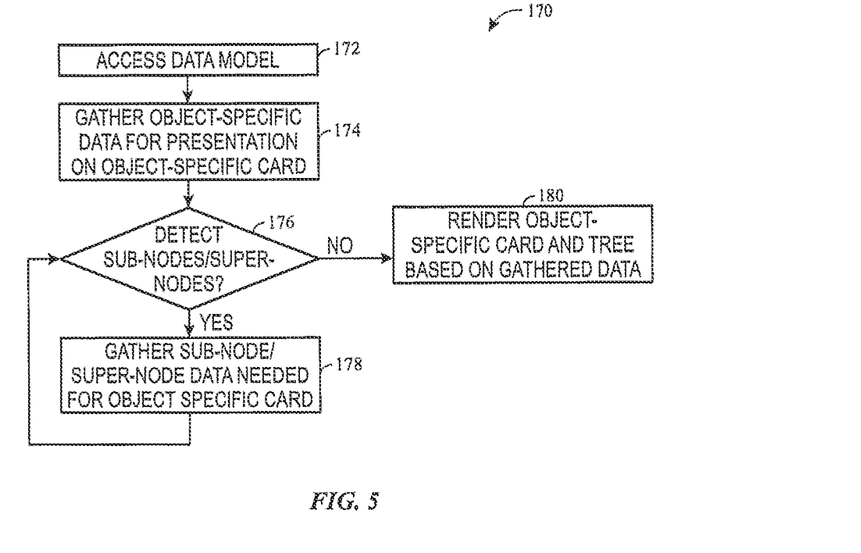
FIG. 5 illustrates a flowchart describing a process for rendering the graphical user interface rendering of FIG. 4, in accordance with certain embodiments.

FIG. 5 illustrates a flowchart describing a process 170 for rendering the graphical user interface rendering of FIGS. 4 and 4', in accordance with certain embodiments. The process 170 begins by accessing the data/object model 14 (block 172).

Starting with a first node (e.g., the root node or top node), the object-specific data useful for GUI rendering is gathered (block 174). For example, the name, job title, etc. may be collected to render the object's card.

The process 170 continues by determining if super nodes (parent nodes) and/or sub nodes (e.g., child nodes) exist (decision block 176). If such nodes exist, the useful information from these nodes is gathered (block 178). For example, a count of sub nodes may be accumulated, a number of sub nodes with a particular title may be accumulated, etc. This process may be iteratively continued until there are no more super nodes and/or sub nodes detected. At this point, the useful data that has been gathered in blocks 174 and 178 is rendered in the graphical user interface of an electronic device display (block 180).

Figure 6:
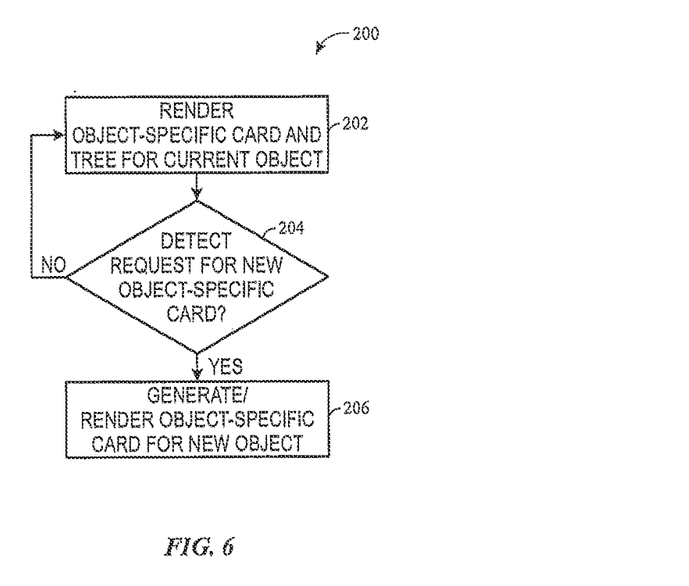
FIG. 6 illustrates a flowchart describing a process for navigating the rendering of FIG. 4, in accordance with certain embodiments.
Figure 7:
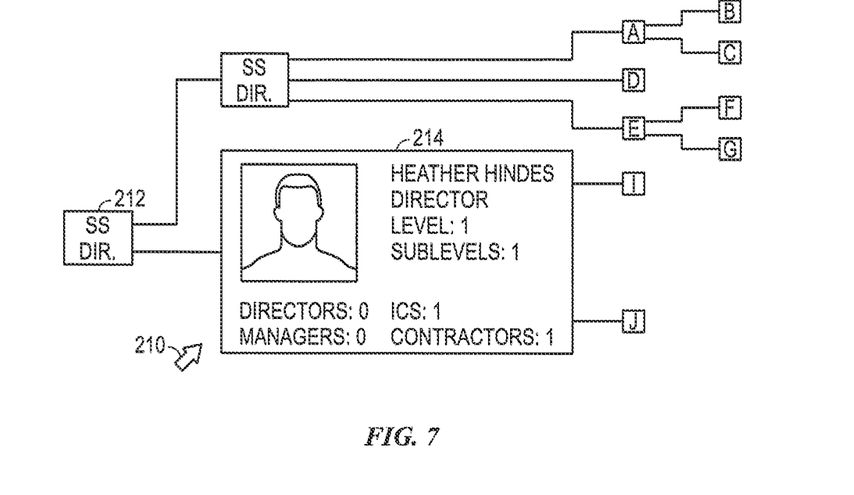
FIG. 7 illustrates a resultant rendering of the graphical user interface based upon navigation via the process of FIG. 6, in accordance with certain embodiments.

FIG. 6 illustrates a flowchart describing a process 200 for navigating the rendering of FIG. 4, in accordance with certain embodiments. FIGS. 7 and 7' illustrate alternative resultant renderings of the graphical user interface based upon navigation via the process of FIG. 6, in accordance with certain embodiments. For clarity, FIGS. 6, 7, and 7' will be discussed together.

The process 200 begins by rendering, an initial rendering of the object specific card and tree structure for the current object (block 202), as discussed in the process 170 of FIG. 5. The system 10 then polls for navigation inputs (and other user inputs) (decision block 204). For example, in the current embodiment, a user input may indicate that a new object-specific card should be rendered and/or expanded (e.g., by a user clicking an unexpanded card and/or a card where direct reports are not exposed).

When such an input is detected, the system 10 generates and/or renders the new object-specific card, in accordance with the user input. For example, returning to the example embodiment of FIG. 4, in FIG. 7, a user input 210 on an unexpanded Heather Hindes card results in the rendering of an unexpanded John Doe card 212 and an expanded Heather Hindes card 214. The other cards remain unaffected. In contrast, turning back to the example embodiment of FIG. 4', a user input 220 on Heather Hindes' card 222, results in expansion of the direct reports 224 of Heather Hindes.

Figure 8:
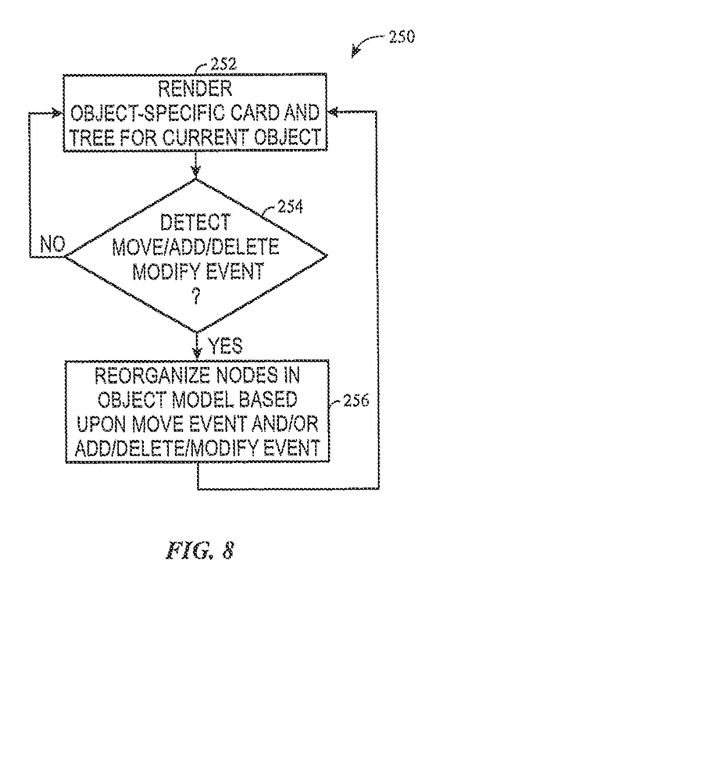
FIG. 8 illustrates a flowchart of a process for modifying the hierarchical data and rendering the modified hierarchical data, in accordance with an embodiment.
Figure 9:
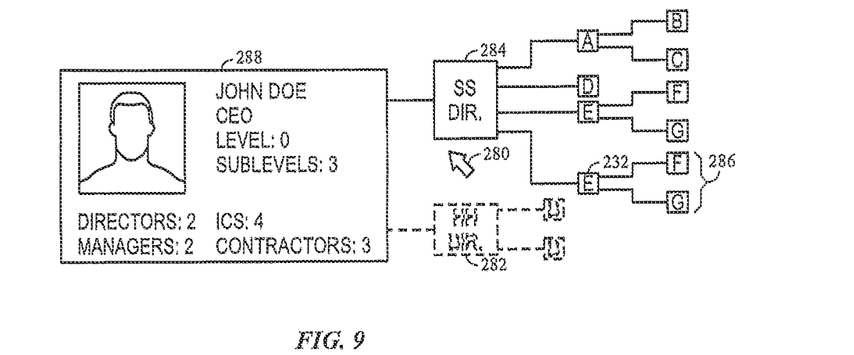
FIG. 9 illustrates a resultant rendering of the graphical user interface based upon a move modification via the process of FIG. 8, in accordance with certain embodiments.

Turning now to modification of data, FIG. 8 illustrates a flowchart of a process 250 for modifying the hierarchical data and rendering the modified hierarchical data, in accordance with an embodiment. FIGS. 9 and 9' illustrate alternative resultant renderings of the graphical user interface based upon a move modification via the process of FIG. 8, in accordance with certain embodiments. For clarity, FIGS. 8, 9, and 9' will be discussed together.

The process 250 begins by rendering, an initial rendering of the object specific card and tree structure for the current object (block 252), as discussed in the process 170 of FIG. 5. The system 10 then polls for modification inputs (and other user inputs) (decision block 254). When modification inputs are detected, the nodes are reorganized in the data/object model 14 and/or the rendering is modified (block 256).

For example, in the current embodiment, a user input may indicate that a particular card should be moved, added, deleted, or modified. In FIGS. 9 and 9', the user input 280 drags Heather Hindes' card 282 over Sally Smith's card 284. This input indicates that Heather Hindes' object and the subordinates should become subordinates of Sally Smith. Accordingly, as illustrated, Heather Hindes' card 282 and the subordinate cards 286 are moved under Sally Smith's card 284. In some embodiments, the data/object model 14 may be updated based upon this modification. However, in some embodiments, merely the rendering is altered.

Further, the card information may be updated based upon the move. For example, in FIG. 9, none of the information in John Doe's card 288 is changed. However, in FIG. 9' an illustration of updated card statistics is provided. For example, in FIG. 9' John Doe's card 288 is updated to indicate that the modification resulted in the direct reports indicator 154 changing from 2 to 1. In the current embodiment, the top value in the direct reports indicator 154 indicates the modified value of 1 and the bottom value indicates the previous value of 2. In certain embodiments, the colors of these values or other characteristics of these values may diverge, emphasizing that one value is the modified value and the other is the previous value.

Additionally, Sally Smith's indicators have been modified as well. For example, her direct reports indicator 154 now indicates a modified value of 4 and a previous value of 3. Further, her total reports indicator 152 indicates that the total number of modified reports is 10 from a previous value of 7. The current examples of modified data values are non-limiting examples. These modified and previous value indications may be used for any number of data items on the cards and may be expressed in any number of ways.

Figure 10:
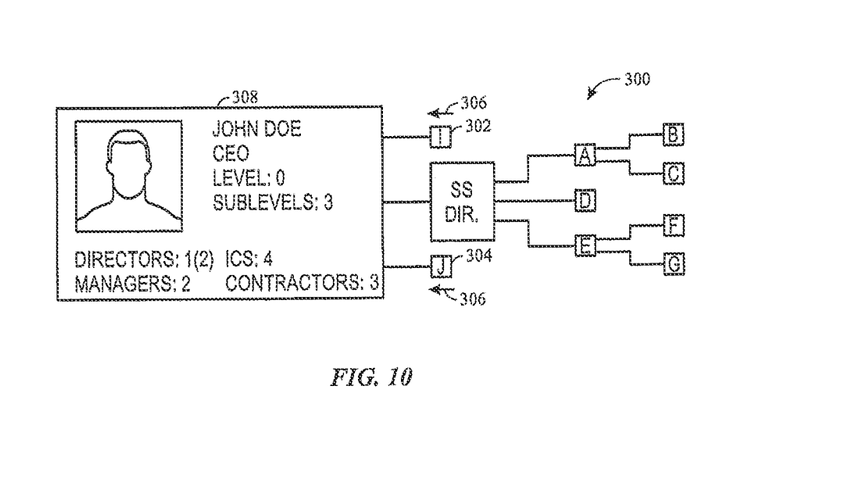
FIG. 10 illustrates a resultant rendering of the graphical user interface based upon a deletion modification via the process of FIG. 8, in accordance with certain embodiments.

FIG. 10 illustrates a resultant rendering 300 of the graphical user interface based upon a deletion modification via the process of FIG. 8, in accordance with certain embodiments. In the current example, a user input indicates that Heather Hindes' card should be deleted. In the current embodiment, such an action results in Heather Hindes' reports shifting up to the employee she reports to, here John Doe. Accordingly, Ian's card 302 and Jackie's card 304 are shifted up to directly report to John Doe, as illustrated by arrows 306. John Doe's card 308 is updated to indicate that he now has 1 director instead of 2, by indicating "1 (2)."

In FIG. 10', an alternative resultant rendering 320 of the graphical user interface based upon a deletion modification via the process of FIG. 8, in accordance with certain embodiments. In FIG. 10', John Doe's card 308 is updated, such that the total indicator 152 illustrates a current value of 10 and a previous value of 11. Further the direct reports indicator 154 indicates an increase to three direct reports (adding Ian and Jackie, but removing Heather).

Additionally the layer indicators 156 of Ian's card 302 and Jackie's card 304 are modified to illustrate that the current level is 1/1, but was previously 2/2.

Figure 11:
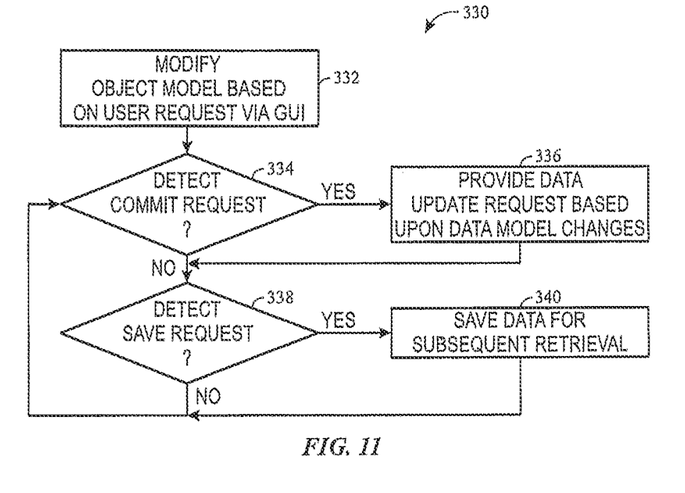
FIG. 11 illustrates a flowchart of a process for committing and/or saving modifications of the hierarchical data, in accordance with certain embodiments.

FIG. 11 illustrates a flowchart of a process 330 for committing and/or saving modifications of the hierarchical data, in accordance with certain embodiments. The process 330 begins by modifying the data/object model based upon the user requests via the GUI (block 332). For example, as discussed above, as user-inputs are received, the data/object model 14 may be updated (e.g., by moving objects, deleting objects, adding objects, modifying attributes of the objects (such as changing a title, name, etc.)).

As illustrated in the example embodiments, the GUI may track modifications made in the GUI and may also stay aware of the current baseline before the modifications (e.g., the previous values displayed in the GUI). The system may poll for a commit request (decision block 334). Upon receiving such a request, the system may provide a committed data update request to the data/object model 14 and/or the source data system 12 of FIG. 1 (block 336).

The system may also detect whether a save request has been provided (decision block 338). When a save request is provided a copy of the modified state of the data/object model may be saved for subsequent retrieval (block 340).

The polling of decision blocks 334 and 338 do not have to take place in this order. In some embodiments, the save polling may occur before the commit request polling. Alternatively, in other embodiments, these polling steps may be performed in parallel.

Figure 12:
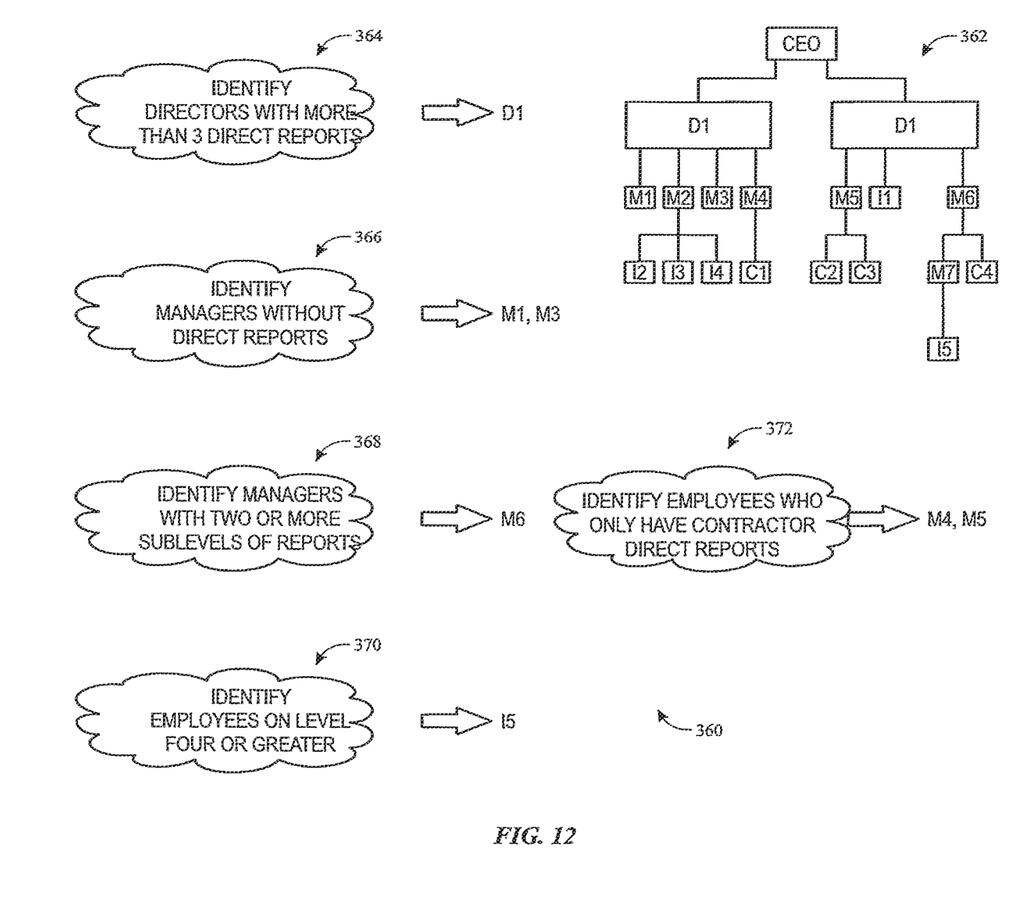
FIG. 12 illustrates example queries that may be invoked using the hierarchical data rendering system, in accordance with certain embodiments.

FIG. 12 illustrates example queries 360 that may be invoked using the hierarchical data rendering 362 of the system 10 of FIG. 1, in accordance with certain embodiments. Queries 360 may be made in the system 10 via voice command interpretation, text-based questioning, query drop downs provided by the system 10, etc. Query 364 requests an identity of directors with more than 3 direct reports. By traversing the tree/node and or flat data, the system 10 may provide an indication that D1 is the only director with more than 3 direct reports.

Further, query 366 requests an identity of managers without direct reports. By traversing the tree/node and or flat data, the system 10 may provide an indication that M1 and M3 are managers that do not include direct reports.

Query 368 requests an identity of managers with 2 or more sublevels of reports. By traversing the tree/node and or flat data, the system 10 may provide an indication that M6 is the only manager with 2 or more sublevels of reports.

Query 370 requests an identity of employees on level 4 or greater. By traversing the tree/node and or flat data, the system 10 may provide an indication that 15 is the only employee on level 4 or greater.

Query 372 requests an identity of employees who only have contractor direct reports. By traversing the tree/node and or flat data, the system 10 may provide an indication that M4 and M5 are the only employees who have only contractors as direct reports.

As may be appreciated, any number of queries may be feasible using the current techniques. The above queries are meant to illustrate non-limiting examples of the potential of hierarchical querying available through the system 10.

Figure 13:
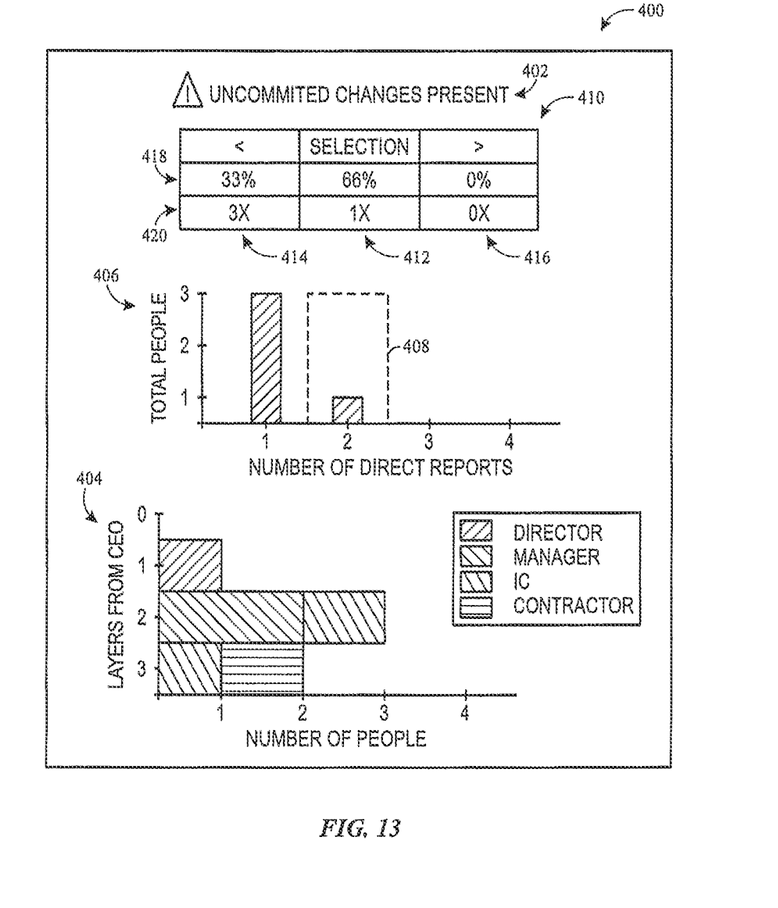
FIG. 13 illustrates an example of an analytics rendering, in accordance with certain embodiments.

FIG. 13 illustrates an example of an analytics rendering 400, in accordance with certain embodiments. The rendering 400 may be presented upon receiving, at the system 10, an indication that analytics for a particular rendered card should be displayed. For example, the current rendering 400 may be a result of receiving an analytics request regarding Sally Smith's card from FIG. 4'. As previously discussed, the rendering 400 may be sourced from uncommitted data. When sourced from uncommitted data, an uncommitted source data warning 402 may be presented in the rendering 400. Bar graphs 404 and 406 may provide analytics regarding the data/object model 14 data. For example, bar graph 404 illustrates a total number of employees at or under Susan Smith's card and the type of employees and how far away from the CEO they are. The graph 404 illustrates that 1 director is 1 level away from the CEO (e.g., Sally Smith). Further, two managers (Amy Adams and Evan Ert) and one individual contributor (Debbie Durst) are two levels away from the CEO. Additionally, one individual contributor (Carla Collins) and one contractor (Bob Billings) are three levels away from the CEO.

Chart 406 illustrates a total number per number of direct reports. For example, Sally has two direct reports with employee paths that total one employee (e.g., Debbie Durst's path has one employee and Evan Ert's path has one employee). Further, Sally has one direct report with three employees in the path (there are three employees on Amy Adam's path).

In some embodiments, a user may select a particular portion of analytic data, as indicated by the selector 408. In such embodiments, a table 410 may indicate statistics particular to the selection (e.g., in selection column 412) and statistics particular to portions less than the selected region (column 414) and/or portions greater than the selected region (column 416). For example, in row 418, a percentage of the total direct reports in the selection 408 is presented in column 412, percentages less than the selected region are provided in column 414, and percentages greater than the selected region are provided in column 416.

Further, in row 420, a multiplier of the selected region 408 regarding the total number of employees in a path are provided in column 412. A multiplier for less than the selection region 408 is provided in column 414 and a multiplier for greater than the selection region 408 is provided in column 416. For example, there are three times as many employees on the path for one direct report as there are for the other two direct reports.

The previous examples are intended to be non-limiting example of the analytical capabilities provided by the current hierarchical data rendering system. Any number of reports and outputs can be provided via the hierarchical analysis discussed herein.

As may be appreciated, by applying the current techniques, hierarchical enterprise data may be efficiently stored and rendered, increasing processing efficiencies. Thus workforce throughput may increase.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory, machine-readable medium, comprising machine readable instructions to:
   interpret a set of data to determine a hierarchical object structure for the set of data, wherein the hierarchical object structure comprises:
      at least one parent object;
      at least one child object that is a subordinate object of the parent object; and
      an indication of each parent/child relationship between the at least one parent object and the at least one child object;
   analyze the set of data to determine a current set of attributes for each of the at least one parent object and the at least one child object;
   receive an input indicative of movement, addition, or deletion of an object of the hierarchical object structure;
   analyze the movement, addition, or deletion of the object and the set of data to determine a proposed set of attributes for each of the at least one parent object and the at least one child object, wherein the proposed set of attributes is uncommitted for each of the at least one parent object and the at least one child object; and
   render a graphical user interface (GUI) that presents two or more graphical cards representing the at least one parent object and the at least one child object, the two or more graphical cards each displaying the current set of attributes and the proposed set of attributes simultaneously.

2. The machine-readable medium of claim 1, wherein the proposed set of attributes comprises at least one different numerical value, at least one different color, or both, relative to the current set of attributes.

3. The machine-readable medium of claim 1, comprising instructions to:
   receive a request to save the proposed set of attributes; and
   modify the hierarchical object structure to indicate the proposed set of attributes in response to receiving the request.

4. The machine-readable medium of claim 1, comprising instructions to:
   receive an analytics request regarding a particular graphical card of the two or more graphical cards representing the at least one parent object or the at least one child object, wherein the analytics request comprises a request to view data of the set of data related to the particular graphical card; and in response to receiving the analytics request, render an additional GUI that presents analytics of the set of data relative to the at least one parent object or the at least one child object.

5. The machine-readable medium of claim 4, comprising instructions to:
in response to determining that the proposed set of attributes is uncommitted, provide, via the additional GUI, a warning indicative of the proposed set of attributes being uncommitted.

6. The machine-readable medium of claim 4, wherein the additional GUI comprises an indication of subordinate objects of the at least one parent object or the at least one child object, an indication of first level children subordinate objects of the at least one parent object or the at least one child object, or both.

7. The machine-readable medium of claim 6, wherein the indication of subordinate objects of the at least one parent object or the at least one child object comprises a first bar graph, the indication of first level children subordinate objects of the at least one parent object or the at least one child object comprises a second bar graph, or both.

8. The machine-readable medium of claim 4, comprising instructions to:
receive a selection of a portion of the additional GUI; and
in response to receiving the selection, provide, via the additional GUI, a table indicating statistics particular to the portion of the additional GUI.

9. A computer-implemented method, comprising:
interpreting a set of data to determine a hierarchical object structure for the set of data, wherein the hierarchical object structure comprises:
at least one parent object;
at least one child object that is a subordinate object of the parent object; and
an indication of each parent/child relationship between the at least one parent object and the at least one child object;
analyzing the set of data to determine a current set of attributes for each of the at least one parent object and the at least one child object;
receiving an input indicative of movement, addition, or deletion of an object of the hierarchical object structure;
analyzing the movement, addition, or deletion of the object and the set of data to determine a proposed set of attributes for each of the at least one parent object and the at least one child object, wherein the proposed set of attributes is uncommitted for each of the at least one parent object and the at least one child object; and
rendering a graphical user interface (GUI) that presents two or more graphical cards representing the at least one parent object and the at least one child object, the two or more graphical cards each displaying the current set of attributes and the proposed set of attributes simultaneously.

10. The computer-implemented method of claim 9, comprising:
receiving a request to save the proposed set of attributes; and
modifying the hierarchical object structure to indicate the proposed set of attributes in response to receiving the request.

11. The computer-implemented method of claim 9, comprising:

receiving an analytics request regarding a particular graphical card of the two or more graphical cards representing the at least one parent object or the at least one child object, wherein the analytics request comprises a request to view data of the set of data related to the particular graphical card; and
in response to receiving the analytics request, rendering an additional GUI that presents analytics of the set of data relative to the at least one parent object or the at least one child object.

12. The computer-implemented method of claim 11, wherein the additional GUI comprises an indication of subordinate objects of the at least one parent object or the at least one child object, an indication of first level children subordinate objects of the at least one parent object or the at least one child object, or both.

13. A system, comprising:
a tangible, non-transitory, storage medium;
a display, configured to present a graphical user interface (GUI) that presents two or more graphical cards representing at least one parent object and at least one child object; and
one or more processors, configured to:
generate a hierarchical object structure for a set of data, wherein the hierarchical object structure comprises:
the at least one parent object;
the at least one child object, wherein the at least one child object is a subordinate object of the at least one parent object; and
an indication of each parent/child relationship between the at least one parent object and the at least one child object;
analyze the set of data to determine a current set of attributes for each of the at least one parent object and the at least one child object;
receive an input indicative of movement, addition, or deletion of an object of the hierarchical object structure;
analyze the movement, addition, or deletion of the object and the set of data to determine a proposed set of attributes for each of the at least one parent object and the at least one child object, wherein the proposed set of attributes is uncommitted for each of the at least one parent object and the at least one child object; and
render the GUI on the display, the GUI presenting the two or more graphical cards with each displaying the current set of attributes and the proposed set of attributes simultaneously.

14. The system of claim 13, wherein the one or more processors are configured to:
receive a request to save the proposed set of attributes; and
modify the hierarchical object structure to indicate the proposed set of attributes in response to receiving the request.

15. The system of claim 13, wherein the one or more processors are configured to:
receive an analytics request regarding a particular graphical card of the two or more graphical cards representing the at least one parent object or the at least one child object, wherein the analytics request comprises a request to view data of the set of data related to the particular graphical card; and
in response to receiving the analytics request, render an additional GUI that presents analytics of the set of data relative to the at least one parent object or the at least one child object.

16. The system of claim 15, wherein the one or more processors are configured to:
in response to determining that the proposed set of attributes is uncommitted, provide, via the additional GUI, a warning indicative of the proposed set of attributes being uncommitted.

17. The system of claim 15, wherein the one or more processors are configured to:
receive a selection of a portion of the additional GUI; and
in response to receiving the selection, provide, via the additional GUI, a table indicating statistics particular to the portion of the additional GUI.

* * * * *